United States Patent Office 3,458,398
Patented July 29, 1969

3,458,398
PROCESS FOR PRODUCING INOSINIC ACID
Takashi Nara, Tokyo, Masanaru Misawa, Kawasaki-shi, and Toshio Komuro, Machida-shi, Japan, assignors to Kyowa Hakko Kogyo Co., Ltd., Tokyo, Japan, a Japanese corporation
No Drawing. Filed July 15, 1966, Ser. No. 565,387
Claims priority, application Japan, July 20, 1965, 40/43,401
Int. Cl. C12d 13/02, 1/00; C12b 1/00
U.S. Cl. 195—28     10 Claims

ABSTRACT OF THE DISCLOSURE

A process for producing inosinic acid by fermentation which comprises culturing a microorganism belonging to the genus Arthrobacter under aerobic conditions in an aqueous nutrient medium containing hypoxanthine. Good yields of inosinic acid are obtained by using *Arthrobacter citreus* ATCC 11624 as the microorganism strain.

---

This invention relates to a process for producing inosinic acid. More particularly, it relates to a process for the production of inosinic acid by fermentation. Even more particularly, the invention relates to a process for the production of inosinic acid by fermentation with certain microorganisms in the presence of hypoxanthine.

Inosinic acid, which is hypoxanthine riboside-5-phosphoric acid ($C_{10}H_{13}N_4O_8P$), is a compound well known in the art. It has been prepared from meat extract, from muscle by the enzymatic deamination of muscle adenylic acid and by the hydrolysis of inosine triphosphate. However, it would be advantageous to have an available convenient fermentation process for the production thereof.

One of the objects of the present invention is to provide an improved process for the production of inosinic acid. Another object of the present invention is to provide a process for producing inosinic acid by fermentation which may be carried out in an efficacious and simple manner.

A further object of the invention is to provide a process for producing inosinic acid by fermentation which gives the product in high purity and good yield.

A still further object of the invention is to provide a process for producing inosinic acid by fermentation which may be carried out advantageously on an industrial scale at low cost to give a high yield of product.

These and other objects and advantages of the present invention will become apparent to those skilled in the art from a consideration of the following specification and claims.

In accordance with the present invention, it has been found that remarkably large quantities of inosinic acid are accumulated in the fermentation liquor and may be recovered therefrom if fermentation is carried out with the use of microorganisms belonging to the genus Arthrobacter and hypoxanthine, natural substances containing hypoxanthine, appropriate substitutes therefor or a culture liquor containing hypoxanthine is added to the culture medium.

The strains to be employed in accordance with the present invention are the inosinic acid-producing strains of Arthrobacter.

Although the particular characteristic of the present invention is to conduct the fermentation in the presence of hypoxanthine, it is to be understood that other nutrient sources conventionally used in the art in such fermentation processes are also to be employed therewith. Thus, either a synthetic culture medium or a natural nutrient medium is suitable in the present invention as long as it contains the essential nutrients for the growth of the strain employed. Such nutrients are well known in the art and include substances such as a carbon source, a nitrogen source, inorganic compounds, vitamins and the like which are utilized by the microorganism employed in appropriate amounts. Thus, as a carbon source, there may be mentioned, by way of example, carbohydrates such as glucose, fructose, maltose, sucrose, mannose, starch hydrolysate, molasses, etc. A single carbon source may be used, or a mixture of two or more than two may also be employed. As a nitrogen source, various kinds of inorganic or organic salts or compounds, such as urea or ammonium salts such as ammonium chloride, ammonium sulfate, ammonium nitrate, ammonium phosphate, etc., or natural substances containing nitrogen, such as cornsteep liquor, yeast extract, meat extract, peptone, fish meal, casein hydrolysates (for example, N-Z-amine), casamino acids, fish solubles, rice brand extract solution, etc. may be employed. The nitrogen source may either be one of these substances or a mixture of two or more. Inorganic compounds which may be added to the culture medium include magnesium sulfate, sodium phosphate, potassium dihydrogen phosphate, potassium monohydrogen phosphate, iron sulfate or other iron salts, sodium chloride, calcium chloride, or other suitable calcium, manganese, zinc or other metal salts. The growth-promoting substance biotin is also employed in the culture medium in large amounts as well as other necessary nutrients such as vitamins.

Hypoxanthine may be added to the culture medium all at one time either at the beginning of culturing or during culturing. Alternatively, the hypoxanthine may be added intermittently during culturing. Moreover, the present invention can also be carried out with the use of an appropriate substitute for hypoxanthine such as inosine. As stated above, the fermentation liquor of microorganisms having the capability of producing hypoxanthine by culturing may also be used. It is to be understood that the term "hypoxanthine" herein is intended to include such substances, such as natural substances or culture liquors, which contain this compound as well as appropriate substitutes therefor.

The fermentation is conducted under aerobic conditions, such as aerobic shaking of the culture or with aerobic stirring of a submerged culture, at a temperature of about 20° to 40° C. and a pH of about 4 to 9. Adjustment of the pH of the culture medium during fermentation can be effected by employing neutralizing agents such as aqueous ammonia, sodium hydroxide and the like. After 2 to 8 days of culturing, remarkably large quantities of inosinic acid are accumulated in the culture medium and in the cell bodies themselves.

After the completion of culturing, the bacterial cells are removed and the filtrate is treated in a conventional manner in order to recover the inosinic acid produced, such as ion exchange resin treatment as shown in Example I below. Alternatively, any of the other conventional recovery techniques such as adsorption, extraction with solvents, precipitation with metallic salts, chromotography and the like may be employed.

The following examples are given merely as illustrative of the present invention and are not to be considered as limiting. Unless otherwise noted, the percentages therein are by weight per liter of water.

The quantity of inosinic acid (IMP) shown in the examples is indicated as the number of milligrams of IMP·2Na·7½H₂O per milliliter of broth.

EXAMPLE I

*Arthrobacter citreus* ATCC 11624 is used as the seed strain. This bacterium is cultured in a culture medium consisting of 2% of glucose, 1% of peptone, 1% of yeast extract, 0.25% of NaCl and 30 μg./l. of biotin at 30° C. for 24 hours. The pH of the seed medium is adjusted to 7.3 before sterilization thereof.

The resultant seed medium is inoculated in a ratio of 10% by volume into the following fermentation composition:

| | | |
|---|---|---|
| Glucose | percent | 10 |
| Yeast extract | do | 1.2 |
| $K_2HPO_4$ | do | 1 |
| $KH_2PO_4$ | do | 1.2 |
| $MgSO_4 \cdot 7H_2O$ | do | 1 |
| $CaCl_2 \cdot 2H_2O$ | do | 0.01 |
| Biotin | μg./l | 30 |
| Hypoxanthine | mg./ml | 2.5 |

The pH of the medium is adjusted to 8.2 with 5 N NaOH before sterilization. After sterilization, urea, separately sterilized, is added to the fermentation medium in a concentration of 0.6%.

30 ml. portions of the mixture of seed and fermentation media are poured into 250 ml. conical flasks, respectively, and sterilized before use. Culturing is then carried out with aerobic shaking at 30° C. After 120 hours of culturing, 8.9 mg./ml. of 5′-inosinic acid are accumulated in the fermentation liquor.

Barium hydroxide is added to 1.2 liters of the filtrate obtained from the fermentation liquor after the removal of the bacterial cells in order to bring the pH thereof to 8.2. Subsequently, the pH is brought to 9.0 with an aqueous sodium hydroxide solution in order to precipitate impurities such as phosphoric acid. The supernatant liquid is then passed through an ion exchange resin column [Diaion-200 (trade name, manufactured by Mitsubishi) which is in the OH form]. The ion exchange resin column is washed with water, eluted with a mixed solution containing 0.5 N formic acid and 0.25 N ammonium formate. The impurities in the element are precipitated with barium hydroxide, and the resultant filtrate is cooled to obtain the crude barium salt of inosinic acid (yield, 8.58 grams). The barium salt is converted to sodium inosinate with $Na_2SO_4$. The data obtained from the product through various tests such as elemental analysis, analyses of the base, sugar, ribose and phosphoric acid components, periodate oxidation and ultraviolet absorption indicate that the product substance is sodium-5′-inosinate.

EXAMPLE II

*Brevibacterium ammoniagenes* ATCC 15312 (adenine-requiring mutant strain) is used as the seed bacterium and is cultured in a culture medium consisting of 10% of glucose, 1% of peptone, 3% of fish solubles, 70 μg./l. of $MnSO_4 \cdot 4H_2O$, 5 μg./ml. of adenine, 30 μg./l of biotin, 0.1% of $K_2HPO_4$, 0.1% of $KH_2PO_4$, 0.05% of $MgSO_4 \cdot 7H_2O$ and 0.6% of urea. The pH of the seed medium is 8.0 before sterilization. Under the same culturing conditions as described in Example I, 8.9 mg./ml. of hypoxanthine is found to be accumulated in the fermentation liquor after 72 hours of culturing.

The solution obtained by removing the cell bodies from the fermentation liquor is diluted with water to give a concentration of 3 mg./ml. of hypoxanthine. Then, a mixture of 7% of glucose, 0.4% of urea, 0.6% of $K_2HPO_4$, 0.7% of $KH_2PO_4$, 0.6% of $MgSO_4 \cdot 7H_2O$, 30 μg./l. of biotin and 0.4% of yeast extract is added to the hypoxanthine solution. The same seed bacterium as employed in Example I (*Arthrobacter citreus* ATCC 11624) is cultured in the thusly prepared fermentation medium under the same culturing conditions as described in Example I. After 120 hours of culturing, 12.8 mg./ml. of 5′-inosinic acid is accumulated in the fermentation liquor and may be recovered therefrom by conventional means.

The invention being thus described, it will be obvious that the same may be varied in many ways. Such variations are not to be regarded as a departure from the spirit and scope of the invention and all such modifications as would be obvious to one skilled in the art are intended to be included herein.

What is claimed is:

1. In a fermentation process for the production of inosinic acid by culturing a microorganism capable of producing inosinic acid and belonging to the genus Arthrobacter in an aqueous nutrient medium under aerobic conditions and accumulating inosinic acid in the resultant culture liquor, the improvement which comprises adding to said medium a substance selected from the group consisting of hypoxanthine and natural substances containing hypoxanthine.

2. The process of claim 1, wherein said substance is added to the medium prior to the initiation of culturing.

3. The process of claim 1, wherein said substance is added to the medium during culturing.

4. The process of claim 1, wherein a derivative of hypoxanthine is substituted for at least a part thereof.

5. The process of claim 4, wherein said derivative is inosine.

6. The process of claim 1, wherein said natural substance is a culture liquor containing hypoxanthine.

7. A process for producing inosinic acid which comprises culturing a microorganism capable of producing inosinic acid and belonging to the genus Arthrobacter in an aqueous nutrient medium containing a source of carbon and nitrogen under aerobic conditions in the presence of a substance selected from the group consisting of hypoxanthine and natural substances containing hypoxanthine and recovering the resultant inosinic acid from the fermentation liquor.

8. The process of claim 7, wherein a derivative of hypoxanthine is substituted for at least a part thereof.

9. The process of claim 7, wherein culturing is carried out at a temperature of from about 20° to 40° C. and a pH of from about 4 to 9.

10. The process of claim 9, wherein said microorganism is *Arthrobacter citreus* ATCC 11624.

References Cited

UNITED STATES PATENTS

| | | |
|---|---|---|
| 3,173,848 | 3/1965 | De Zeeuw. |
| 3,268,415 | 8/1966 | Kinoshita et al. |
| 3,296,087 | 1/1967 | Mitsugi et al. |

ALVIN E. TANENHOLTZ, Primary Examiner